(12) United States Patent
Beutler

(10) Patent No.: US 7,241,246 B2
(45) Date of Patent: Jul. 10, 2007

(54) DIFFERENTIAL ASSEMBLY WITH COVER GASKET HAVING INTEGRAL MAGNET

(75) Inventor: Kevin R. Beutler, Columbiaville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 425 days.

(21) Appl. No.: 10/992,207

(22) Filed: Nov. 18, 2004

(65) Prior Publication Data

US 2006/0103232 A1  May 18, 2006

(51) Int. Cl.
*F16H 48/06* (2006.01)
*F16J 15/53* (2006.01)

(52) U.S. Cl. .................... 475/230; 277/629

(58) Field of Classification Search .......... 74/606 R, 74/607; 475/220, 230; 277/629
See application file for complete search history.

(56) References Cited

U.S. PATENT DOCUMENTS

| | | | |
|---|---|---|---|
| 3,240,341 A | 3/1966 | Rosaen | |
| 3,406,979 A | 10/1968 | Weber | |
| 3,708,177 A | 1/1973 | Baermann | |
| 5,294,350 A * | 3/1994 | Murphy et al. | 210/167.03 |
| 5,828,795 A | 10/1998 | Miyakoshi et al. | |
| 6,413,183 B1 | 7/2002 | Ishikawa et al. | |
| 6,530,575 B2 | 3/2003 | Poquet et al. | |
| 6,575,473 B2 | 6/2003 | Sugimoto et al. | |
| 6,588,765 B2 | 7/2003 | Hiramatsu et al. | |
| 6,618,924 B1 | 9/2003 | Irwin | |
| 6,675,676 B2 | 1/2004 | Beutler | |
| 6,843,747 B1 | 1/2005 | Phanco et al. | |
| 6,938,731 B2 * | 9/2005 | Slesinski | 184/6.25 |
| 7,014,772 B2 * | 3/2006 | Eleftherakis et al. | 210/695 |
| 2001/0008194 A1 | 7/2001 | Hori | |
| 2003/0000337 A1 | 1/2003 | Camping | |
| 2003/0110885 A1 | 6/2003 | Beutler | |
| 2003/0173301 A1 | 9/2003 | Eleftherakis et al. | |
| 2004/0134859 A1 | 7/2004 | Leimann | |

FOREIGN PATENT DOCUMENTS

JP          05172219         7/1993

* cited by examiner

*Primary Examiner*—Dirk Wright
(74) *Attorney, Agent, or Firm*—Harness, Dickey & Pierce, P.L.C.

(57) ABSTRACT

An axle assembly for a vehicle includes a housing, a differential assembly rotatably supported within the housing, a differential cover and a gasket assembly positioned between the housing and the differential cover. The gasket assembly includes a body and a magnet coupled to the body. The magnet is positioned in communication with a lubricant located within the interior of the housing.

20 Claims, 5 Drawing Sheets

US 7,241,246 B2

DIFFERENTIAL ASSEMBLY WITH COVER GASKET HAVING INTEGRAL MAGNET

BACKGROUND AND SUMMARY OF THE INVENTION

The present invention relates to a gasket assembly for a differential cover of a vehicle drivetrain, and more particularly, to a gasket having an integral magnet.

Many vehicles are equipped with a carrier housing rotatably supporting a differential assembly. The differential assembly is typically positioned between a vehicle transmission and output axles to supply a driving force to the vehicle wheels. The differential assembly includes gearing to transmit drive torque to the output shafts while permitting speed differentiation between the output shafts. A ring gear is typically coupled to the differential housing. The ring gear is in driving engagement with a pinion gear coupled to a rotatable input member. A volume of lubricating fluid is stored within the carrier housing to lubricate the gearing. Over time, the gears, bearings and housing may wear and metal particles enter the lubricant. A differential cover is coupled to the carrier housing to protect the gearing from the external environment and to maintain the lubricant within the housing. The differential cover is removable to allow service access to the gearing.

Many carrier assemblies include a magnet permanently coupled to the differential cover or the carrier housing to function as a metallic particle collection device. Attachment of the magnet to the bottom of the carrier housing or to the differential cover pan is typically costly due to the requisite cleaning and preparation processes associated with adhesively attaching a magnet. Furthermore, durability concerns exist because the magnets may dislodge or move within the carrier housing leading to possible component damage.

The present invention relates to an axle assembly for a vehicle. The axle assembly includes a housing, a differential assembly rotatably supported within the housing, a differential cover and a gasket assembly positioned between the housing and the differential cover. The gasket assembly includes a body and a magnet coupled to the body. The magnet is positioned in communication with a lubricant located within the interior of the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
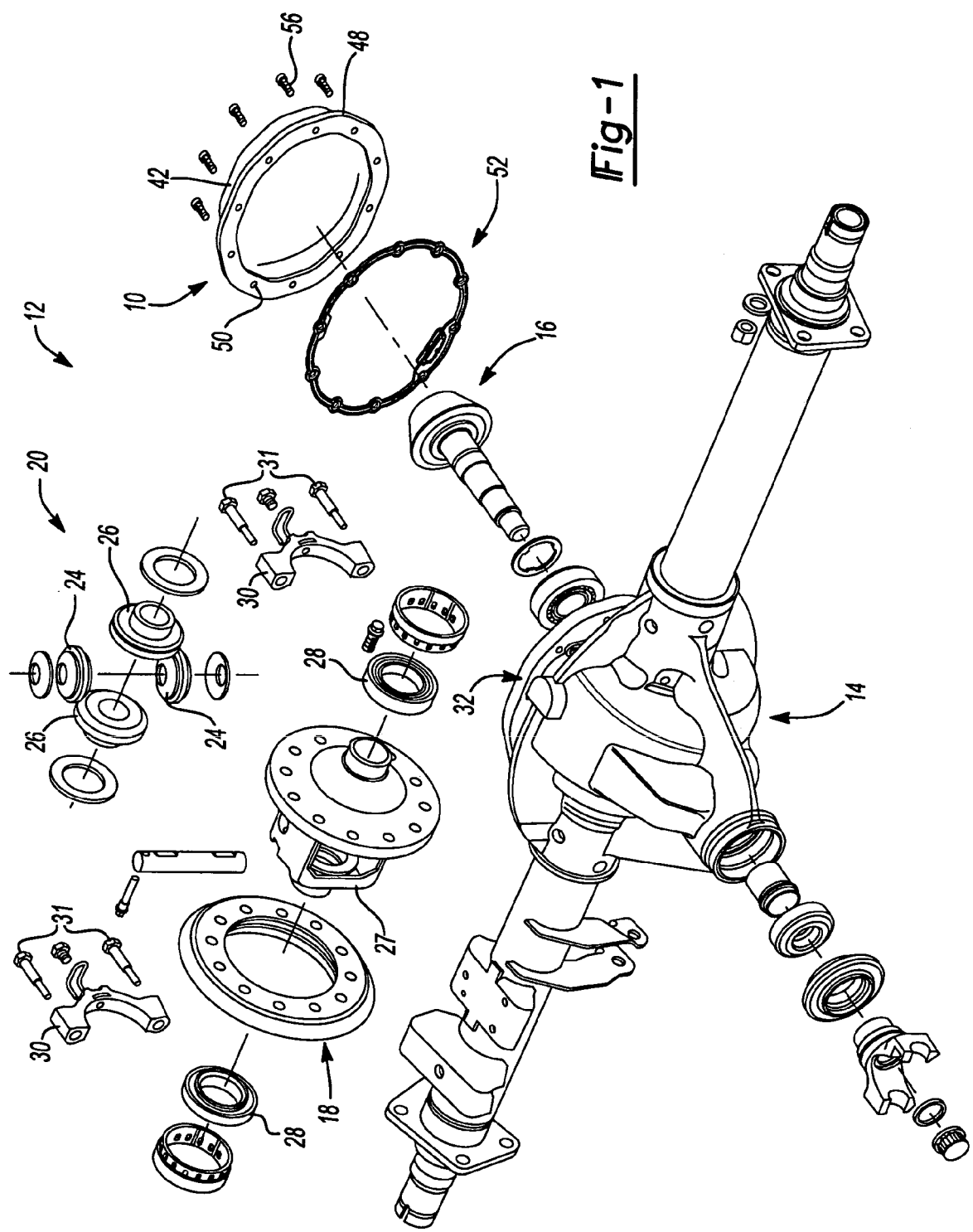
FIG. 1 is an exploded perspective view of an exemplary axle assembly constructed in accordance with the teachings of the present invention.
Figure 2:
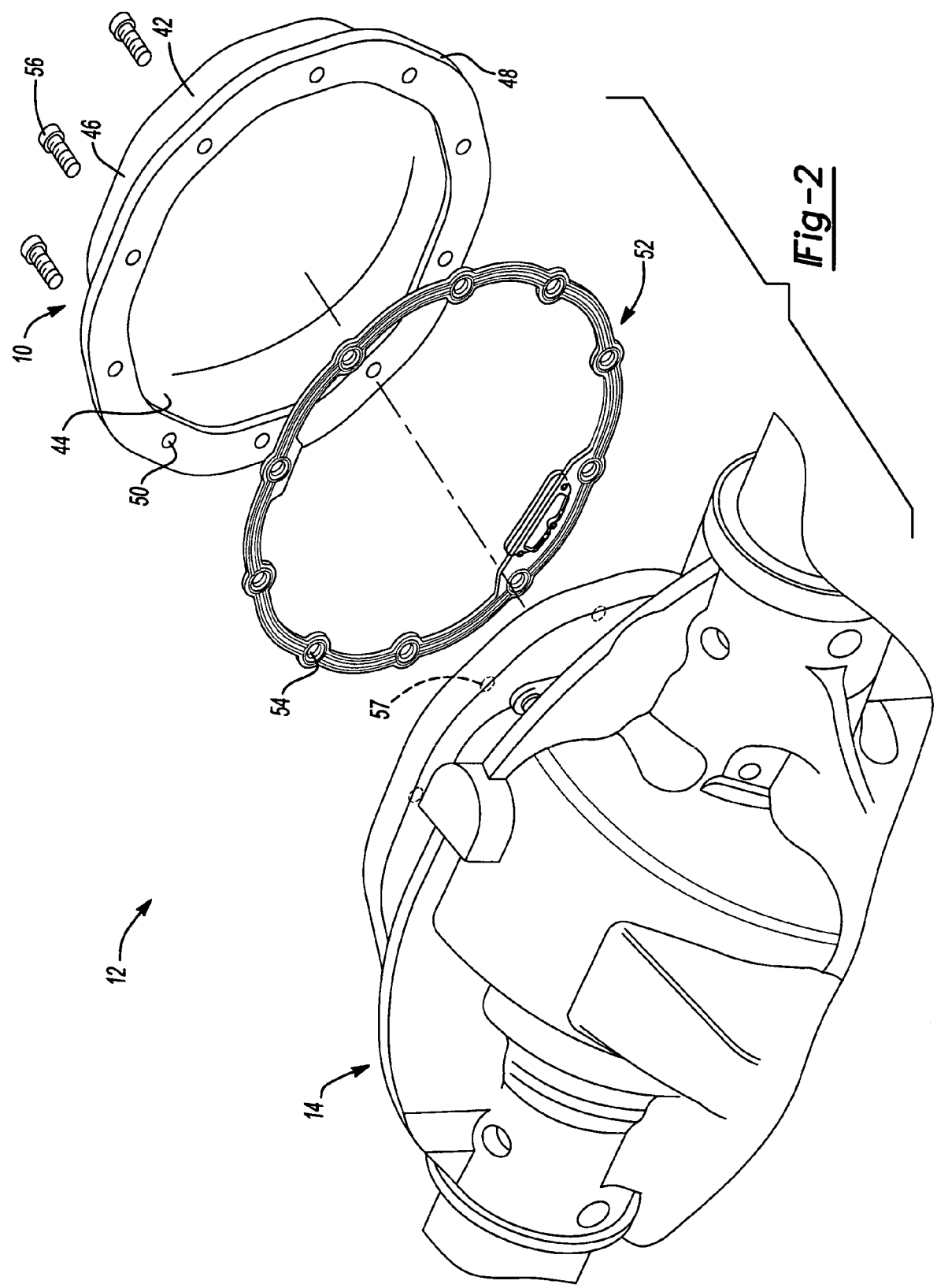
FIG. 2 is a partial fragmentary exploded perspective view depicting a carrier housing, a differential cover and a cover gasket and magnet assembly of the present invention.
Figure 3:
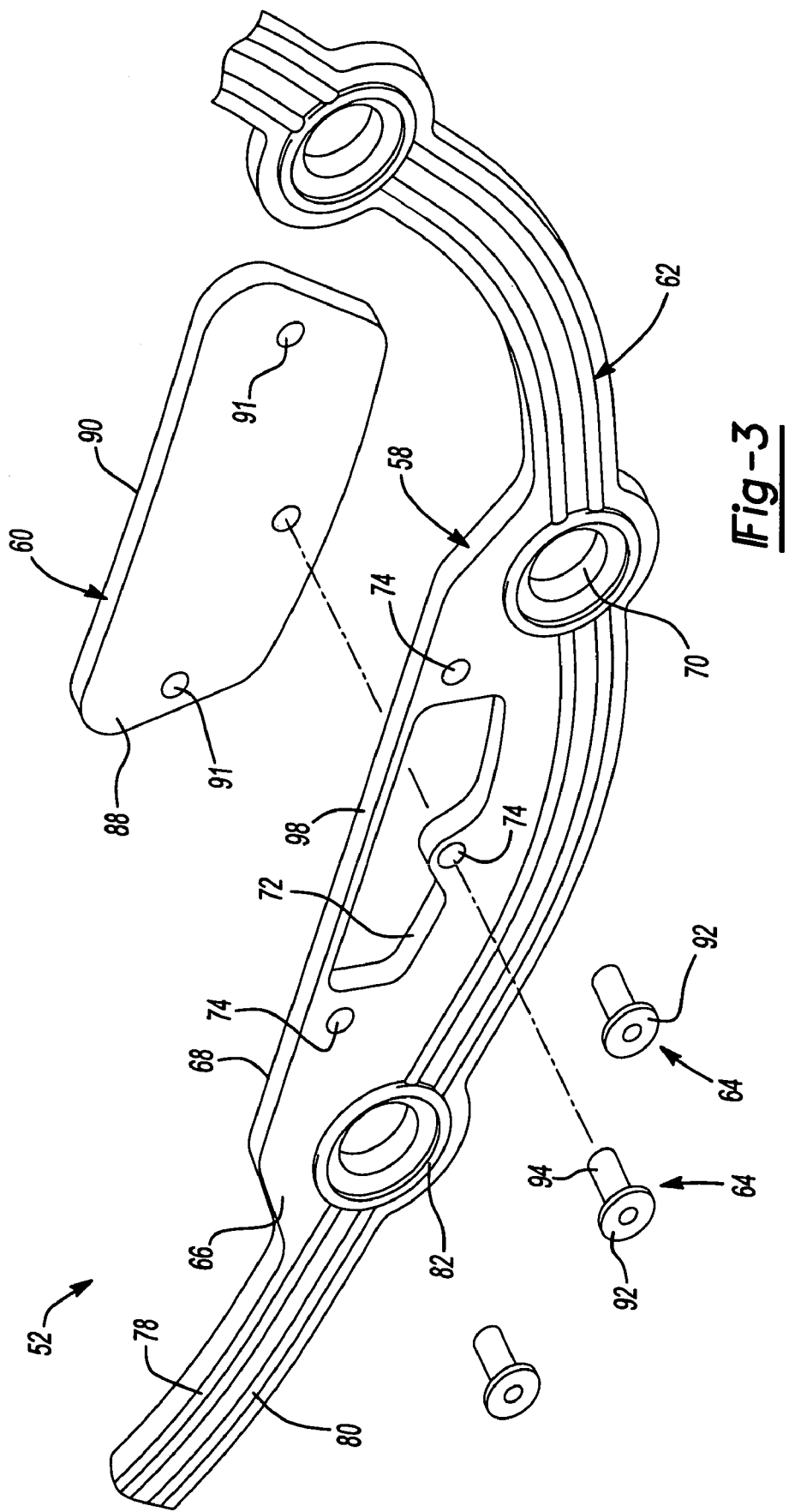
FIG. 3 is an enlarged fragmentary perspective view of the cover gasket and magnet assembly of the present invention.

FIGS. 1 and 2 depict an exemplary drive axle assembly 12 including an axle carrier 14 for rotatably mounting a gearset including a pinion gear 16 and a ring gear 18. A differential assembly 20 is drivingly interconnected to ring gear 18. The differential assembly functions to transfer power to a pair of axle shafts (not shown) while compensating for any difference in axle shaft speed rotation as they occur during a turn or other steering maneuver. The differential assembly 20 includes a pair of pinion gears 24 and a pair of side gears 26 mounted in a differential housing 27. The side gears 26 are drivingly interconnected to the axle shafts thereby providing a power transmission path to a pair of vehicle wheels (not shown). To facilitate proper function of the axle assembly 12, the differential housing 27 is rotatably mounted on a pair of differential bearings 28. Furthermore, the axle carrier 14 includes two semi-circular journals (not shown) for supporting approximately one-half of each of the differential bearings 28. Similarly, a pair of bearing caps 30 journally support the remaining approximate one-half of each of the differential bearings 28 when coupled to the axle carrier 14 via threaded fasteners 31. It should be appreciated that the axle carrier 14 further includes an opening 32 to provide access to the differential assembly 20.

The differential cover pan 10 is useful for providing service access to the components mounted within the axle carrier 14. The cover pan 10 is preferably stamped from a steel sheet and formed in the shape of a shell 42 having an inner surface 44 and an outer surface 46 terminating at a mounting flange 48. The mounting flange 48 includes a plurality of fastener apertures 50 extending therethrough for securing the cover pan 10 to the axle carrier 14 and enclosing the opening 32.

FIGS. 2-5 depict a cover gasket and magnet assembly 52 sealingly positioned between differential cover pan 10 and axle carrier 14. Cover gasket and magnet assembly 52 is shaped as a closed ring having the shape of mounting flange 48 on differential cover pan 10. A plurality of apertures 54 are circumferentially spaced apart from one another and positioned to align with the plurality of fastener apertures 50 extending through cover pan 10. A plurality of fasteners 56 extends through fastener apertures 50 of cover pan 10 and apertures 54 of cover gasket and magnet assembly 52. Fasteners 56 are threadingly engaged with threaded apertures 57 formed within axle carrier 14. Fasteners 56 provide a clamping force to biasedly deform at least a portion of cover gasket and magnet assembly 52 to enclose the opening 32 formed in axle carrier 14.

In the embodiment depicted in the Figures, cover gasket and magnet assembly 52 includes a rigid body 58, a magnet 60, an elastomer 62 and a plurality of rivets 64. Rigid body 58 is shaped as a ring having a substantially planar first surface 66 and a substantially planar second surface 68. A plurality of fastener apertures 70 extend through rigid body 58. A window 72 and magnet fastener apertures 74 also extend through rigid body 58. Window 72 functions to expose additional surface area of magnet 60 to possibly contaminated lubricant. In this manner, the surface area of magnet 60 exposed to lubricant is maximized. Rigid body 58 may be constructed from metal, or a rigid composite.

Elastomer 62 is coupled to rigid body 58 using any number of methods such as molding, coating, gluing or any other method suitable for attaching the elastomer to the rigid body. Elastomer 62 includes a first portion 76 coupled to first surface 66 of rigid body 58. First portion 76 includes a first sealing bead 78 and a second sealing bead 80 extending about the periphery of rigid body 58. A plurality of sealing rings 82 are circumferentially spaced apart from one another and positioned on first surface 66 of body 58. Each sealing ring 82 circumscribes a fastener aperture 70 and interrupts sealing beads 78 and 80. It should be appreciated that elastomer 62 may include any number of shapes where first sealing bead 78, second sealing bead 80 and sealing ring 82 may be integrally formed with one another, separate from another or may be shaped to include differential profiles from those depicted in the drawings.

Elastomer 62 includes a second portion 84 coupled to second surface 68 of rigid body 58. In the embodiment shown, second portion 84 is shaped substantially similar to first portion 76. However, one skilled in the art will appreciate that the first and second portions need not be identical to function according to the principles of the present invention. During installation of fasteners 56, a clamping force is provided between mounting flange 48 and axle carrier 14 such that first portion 76 and second portion 84 of elastomer 62 are at least partially deformed. Specifically, first bead 78 and second bead 80 are positioned in biased engagement with a mounting face 86 of axle carrier 14. Similarly, second portion 84 of elastomer 62 is biasedly engaged with mounting flange 48.

Magnet 60 is a substantially plate-shaped member having a first substantially planar surface 88 and a second substantially planar opposite surface 90. A plurality of apertures 91 extend through magnet 60. Rivets 64 include a head portion 92 and hollow cylindrical body portion 94. Each cylindrical body portion 94 extends through an aperture 74 of rigid body 58 and an aperture 91 of magnet 60. Tubular portions 94 are deformed to form a flange 96 capturing magnet 60 and rigid body 58 between head portion 92 and flange 96. Magnet 60 is sized to radially inwardly extend beyond a surface 98 of rigid body 58. As such, the surface area of magnet 60 exposed to lubricant is maximized. Based on this construction, a magnet of relatively small size may be utilized to attract metallic particles within the lubricant.

Figure 4:
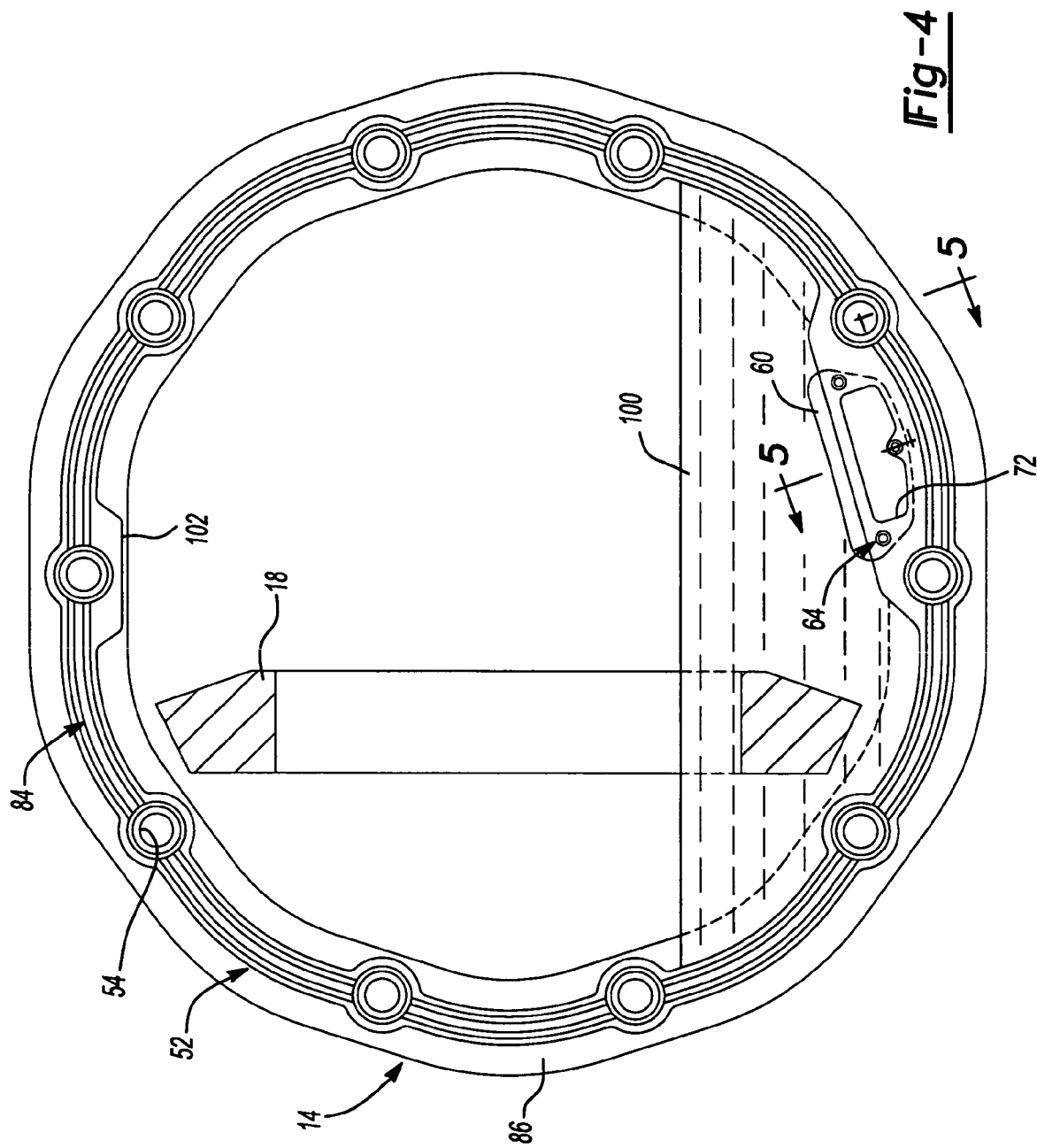
FIG. 4 is a partial end view of an axle assembly having the differential cover removed.
Figure 5:
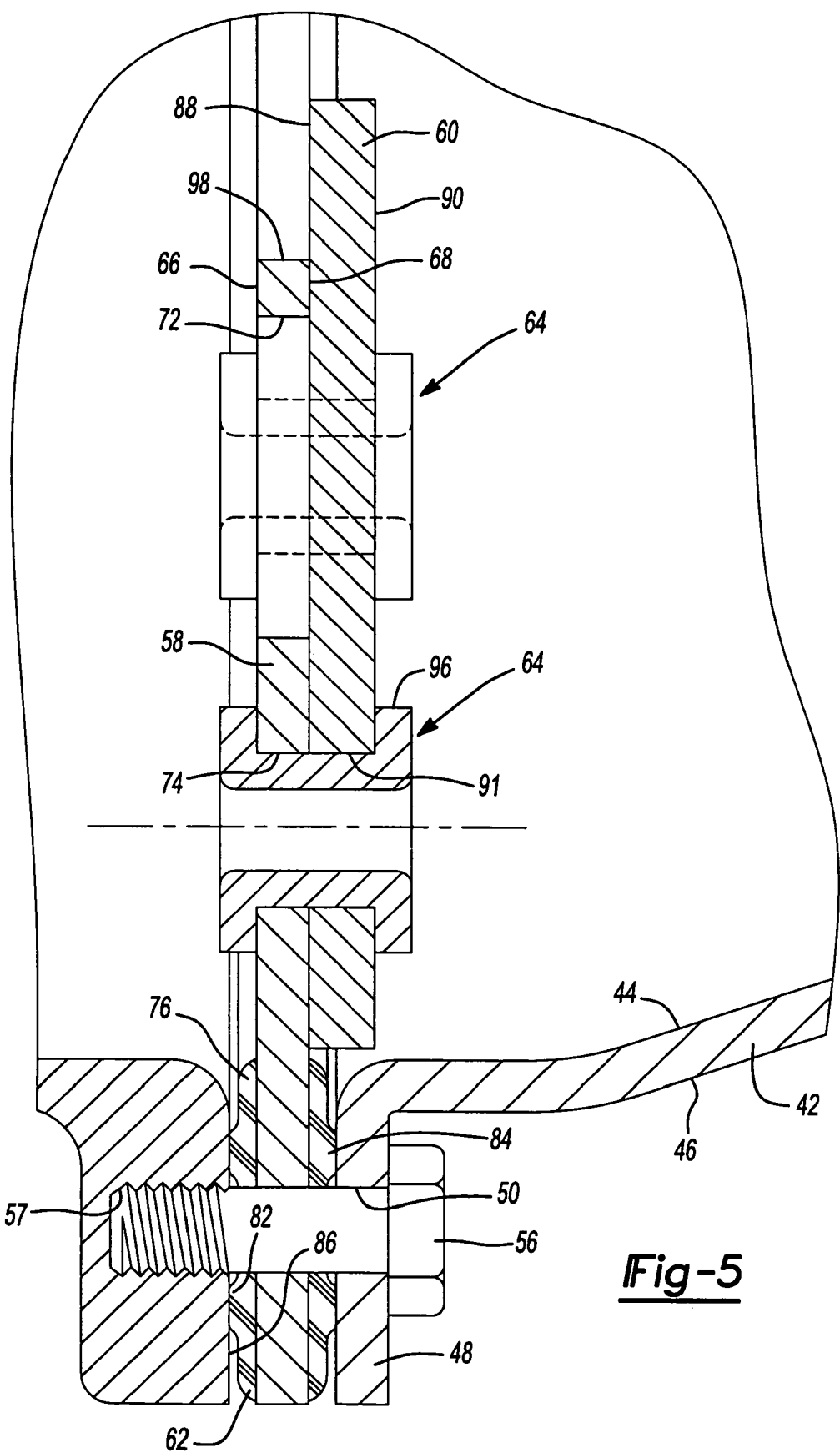
FIG. 5 is a fragmentary cross-sectional side view of an exemplary axle assembly including a cover gasket and magnet assembly.

FIG. 4 depicts cover gasket and magnet assembly 52 properly positioned on axle carrier 14. A volume of lubricant within axle carrier 14 is indicated at reference numeral 100. Magnet 60 is positioned below the surface of lubricant 100 at or near the lowest point of axle carrier 14 in an attempt to attract the greatest number of magnetic particles contained within the lubricant. Through the use of cover gasket and magnet assembly 52, the magnet 60 may be properly positioned at or near a low velocity zone of lubricant to ensure particle retention to the magnet surfaces. To assure proper positioning of cover gasket and magnet assembly 52 relative to axle carrier 14, body 58 includes a radially inwardly extending tab 102. Tab 102 may be labeled "TOP" or have some other method of notifying an installer that tab 102 is to be positioned at the uppermost threaded aperture 57.

Additional benefits of cover gasket and magnet assembly 52 may be realized. For example, a failure mode of an operator forgetting to glue a magnet within axle carrier 14 may be avoided because visual verification of the presence of cover gasket and magnet assembly 52 may be made. Furthermore, if cover gasket and magnet assembly 52 were not in place, the assembly would most likely leak lubricant immediately or soon after fill. In addition, because magnet 60 is a component of cover gasket and magnet assembly 52, a higher probability exists that the magnet will be cleaned if the differential cover is removed by a service technician. Typically, many service technicians will clean and inspect a useable gasket to determine if it may be reinstalled and put back into service.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly for a vehicle comprising:
   a housing;
   a differential assembly rotatably supported within the housing;
   a differential cover having a flange;
   a gasket assembly including a body and a magnet coupled to the body, the gasket assembly being positioned between the housing and the differential cover flange to seal an interior of the housing from an external environment, wherein the magnet is positioned in communication with a lubricant located within the interior of the housing.

2. The axle assembly of claim 1 wherein the gasket body is substantially rigid and is shaped as a closed loop.

3. The axle assembly of claim 2 wherein the gasket body includes an aperture extending therethrough, the aperture being located adjacent to the magnet to expose additional surface area of the magnet to the lubricant.

4. The axle assembly of claim 3 wherein the magnet is operable to attract undesirable metallic particles located in the lubricant.

5. The axle assembly of claim 4 further including a plurality of fasteners interconnecting the magnet and the body.

6. The axle assembly of claim 1 further including an elastomer coupled to the body, the elastomer being in biased engagement with one of the housing and the differential cover.

7. The axle assembly of claim 1 further including a ring gear coupled to the differential assembly, the ring gear being at least partially submersed in the lubricant.

8. The axle assembly of claim 7 wherein the magnet is positioned within an opposite hemisphere of the interior of the housing as the ring gear.

9. The axle assembly of claim 1 wherein the gasket assembly includes a tab to indicate a desired orientation of the gasket assembly relative to the housing.

10. The axle assembly of claim 9 wherein the tab is a radially inwardly extending portion of the body.

11. The axle assembly of claim 1 wherein the gasket assembly includes a plurality of apertures, at least one of the apertures having a fastener extending therethrough, the fastener being operable to removably mount the differential cover to the housing.

12. An axle assembly for a vehicle comprising:
    a housing;
    a pinion gear rotatably supported by the housing;
    a differential assembly rotatably supported by the housing, the differential assembly including a pair of pinion gears and a pair of side gears rotatably supported within a differential housing;

a differential cover;

a gasket assembly including an elastomeric portion positioned between the housing and the differential cover and a magnet positioned within a cavity defined by the housing and differential cover, the magnet being in communication with a lubricant located within the cavity.

13. The axle assembly of claim 12 wherein the gasket assembly includes a rigid body, the elastomeric portion and the magnet being coupled to the rigid body.

14. The axle assembly of claim 13 wherein the rigid body forms a closed ring.

15. The axle assembly of claim 14 wherein the magnet radially inwardly extends beyond an edge of the rigid body.

16. A gasket assembly for an axle assembly having a housing, a differential assembly rotatably supported in a cavity defined by the housing, a differential cover coupled to the housing for providing access to the differential unit, and a lubricant located within the cavity, the gasket assembly comprising:

a substantially rigid body shaped as a continuous ring having a first substantially planar surface and an opposite second substantially planar surface;

an elastomer coupled to one of the first and second substantially planar surfaces; and a magnet coupled to the substantially rigid body, the magnet being adapted to attract metallic particles suspended within the fluid located within the cavity of the housing.

17. The gasket assembly of claim 16 wherein elastomeric material is coupled to both of the first and second substantially planar surfaces.

18. The gasket assembly of claim 17 wherein the substantially rigid body includes an aperture extending therethrough, the aperture being located adjacent to the magnet to expose additional surface area of the magnet to the lubricant.

19. The gasket assembly of claim 18 further including a plurality of fasteners interconnecting the magnet and the body.

20. The gasket assembly of claim 19 wherein the magnet radially inwardly extends beyond an edge of the rigid body.

* * * * *